(12) United States Patent
Itoh et al.

(10) Patent No.: US 10,610,889 B2
(45) Date of Patent: Apr. 7, 2020

(54) MULTI-LAYER COATING FILM FORMATION METHOD

(71) Applicant: KANSAI PAINT CO., LTD., Hyogo (JP)

(72) Inventors: Masayuki Itoh, Aichi (JP); Kenichiro Matsunaga, Kanagawa (JP); Yosuke Toyoda, Kanagawa (JP); Tatsuo Kuramochi, Kanagawa (JP); Nobuhiko Narita, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 15/746,136

(22) PCT Filed: Jul. 29, 2016

(86) PCT No.: PCT/JP2016/072451
§ 371 (c)(1),
(2) Date: Jan. 19, 2018

(87) PCT Pub. No.: WO2017/022698
PCT Pub. Date: Feb. 9, 2017

(65) Prior Publication Data
US 2018/0214912 A1  Aug. 2, 2018

(30) Foreign Application Priority Data

Jul. 31, 2015 (JP) .................................. 2015-151682
Mar. 11, 2016 (JP) .................................. 2016-048602

(51) Int. Cl.
*B05D 7/00* (2006.01)
*B05D 1/36* (2006.01)
*C09D 5/36* (2006.01)
*B05D 7/14* (2006.01)
*C09D 201/00* (2006.01)
*B05D 5/06* (2006.01)
*C09D 7/62* (2018.01)
*B05D 3/00* (2006.01)
*C09D 133/02* (2006.01)
*C08K 9/02* (2006.01)

(52) U.S. Cl.
CPC ............... *B05D 7/572* (2013.01); *B05D 1/36* (2013.01); *B05D 3/007* (2013.01); *B05D 5/061* (2013.01); *B05D 5/067* (2013.01); *B05D 7/14* (2013.01); *B05D 7/57* (2013.01); *C09D 5/36* (2013.01); *C09D 7/62* (2018.01); *C09D 133/02* (2013.01); *C09D 201/00* (2013.01); *B05D 7/574* (2013.01); *B05D 2201/00* (2013.01); *B05D 2202/10* (2013.01); *C08K 9/02* (2013.01)

(58) Field of Classification Search
None
See application file for complete search history.

(56) References Cited

U.S. PATENT DOCUMENTS

| 5,100,735 A * | 3/1992 | Chang ................... B05D 7/534 427/407.1 |
| 5,721,018 A * | 2/1998 | Goldner ................ B05D 5/068 427/140 |
| 6,335,057 B1 | 1/2002 | Noura et al. |
| 2004/0102552 A1* | 5/2004 | Boisseau .............. C09D 133/04 524/155 |
| 2007/0104874 A1 | 5/2007 | Ogawa et al. |
| 2009/0035476 A1 | 2/2009 | Uemura et al. |
| 2009/0205537 A1* | 8/2009 | Ambrose ............. C08G 59/506 106/287.11 |
| 2011/0052823 A1* | 3/2011 | Steinmetz ........... C08F 283/006 427/407.1 |
| 2011/0319581 A1* | 12/2011 | Yamaguchi ............ A61K 8/897 526/247 |
| 2015/0210867 A1 | 7/2015 | Fujiwara |

(Continued)

FOREIGN PATENT DOCUMENTS

| CA | 3 030 637 | 1/2018 |
| JP | 63-272544 | 11/1988 |
| JP | 11-90318 | 4/1999 |

(Continued)

OTHER PUBLICATIONS

International Search Report dated Oct. 25, 2016 in International (PCT) Application No. PCT/JP2016/072451.

(Continued)

*Primary Examiner* — Francisco W Tschen
(74) *Attorney, Agent, or Firm* — Wenderoth, Lind & Ponack, L.L.P.

(57) ABSTRACT

The present invention relates to a method for forming a multilayer coating film, the method comprising sequentially applying a colored coating composition (X), an effect pigment dispersion (Y), and a clear coating composition (Z) to a substrate to form an uncured colored coating film, an uncured effect coating film, and an uncured clear coating film, respectively, and heating the uncured colored coating film, the uncured effect coating film, and the uncured clear coating film to simultaneously cure these three coating films, thereby forming a multilayer coating film; wherein the effect pigment dispersion (Y) contains water, a specific surface modifier (A), a flake-effect pigment (B), and a viscosity modifier (C); and a film obtained by applying the effect pigment dispersion (Y) to a dry film thickness of 0.2 μm has a light transmittance at a wavelength of 550 nm of 10 to 50%.

12 Claims, No Drawings

(56) References Cited

U.S. PATENT DOCUMENTS

2015/0368484 A1 12/2015 Shishaku et al.

FOREIGN PATENT DOCUMENTS

| JP | 2003-313500 | 11/2003 |
|----|-------------|---------|
| JP | 2005-120249 | 5/2005 |
| JP | 2006-95522 | 4/2006 |
| JP | 2009-28690 | 2/2009 |
| JP | 2009-28693 | 2/2009 |
| JP | 2009-155537 | 7/2009 |
| JP | 2014-4552 | 1/2014 |
| JP | 2014-51628 | 3/2014 |
| JP | 2014-169434 | 9/2014 |
| JP | 2015-51385 | 3/2015 |
| JP | 5685044 | 3/2015 |
| WO | 2004/105965 | 12/2004 |
| WO | 2009/157588 | 12/2009 |
| WO | 2014/024884 | 2/2014 |
| WO | 2014/119781 | 8/2017 |
| WO | 2013/012014 | 1/2018 |

OTHER PUBLICATIONS

International Preliminary Report on Patentability dated Nov. 9, 2017 in International (PCT) Application No. PCT/JP2016/072451.
Extended European Search Report dated Mar. 22. 2019 in corresponding European Patent Application No. 16832977.9.

* cited by examiner

MULTI-LAYER COATING FILM FORMATION METHOD

CROSS-REFERENCE TO RELATED APPLICATION

The present application claims priority to Japanese Patent Application No. 2015-151682 filed on Jul. 31, 2015, and Japanese Patent Application No. 2016-048602 filed on Mar. 11, 2016, the entire contents of which are incorporated herein by reference.

TECHNICAL FIELD

Technical Field

The present invention relates to a method for forming a multilayer coating film.

Background Art

The purpose of applying coating compositions is mainly to protect materials and impart an excellent appearance. For industrial products, excellent appearance, particularly "texture," is important in terms of enhancing their product power. Although there are various textures for industrial products desired by consumers, luster like metal or pearl (hereinafter referred to as "metallic luster") has recently been desired in the field of automobile exterior panels, automobile components, home electronics, and the like.

Metallic luster is a texture characterized in that the surface has no graininess, like a mirror-finished surface, in that the coated plate looks shiny when viewed nearly perpendicular to the coated plate (highlight), and in that, conversely, the coated plate looks dark when viewed obliquely to the coated plate (shade). That is, there is a large luminance difference between the highlight region and the shade region.

Techniques to impart metallic luster to the surface of industrial products include metal plating treatment, metal deposition treatment (e.g., PTL 1), and the like. If metallic luster can be imparted by coating, it is advantageous in terms of ease, cost, and the like.

PTL 2 discloses a method for forming a metallic coating film, the method comprising applying a composition comprising non-leafing aluminum flakes and an organic solvent to an uncured coating surface, and then applying a clear coating composition.

PTL 3 discloses a metallic coating composition prepared by diluting a metallic coating material base containing an effect material, a resin-containing non-volatile solid, and a solvent with a diluent comprising a high-boiling solvent and a low-boiling solvent at a dilution rate of 150 to 500%, and adding 5 to 10 parts by weight of viscous resin based on 100 parts by weight of the resin content in the metallic coating material base.

PTL 4 discloses a metallic coating composition prepared by diluting a coating material base comprising, on a solid basis, 10 to 30% of an effect material, 10 to 50% of a cellulose acetate butyrate resin having a molecular weight of 25,000 to 50,000 (MWn), and an acrylic melamine resin as a balance, with an ester-based solvent and/or a ketone-based solvent at a dilution rate in which the solids content is 1 to 10 wt. %.

PTL 5 discloses a method for forming a multilayer coating film, the method using an effect material-containing base coating composition comprising colloidal particles containing precious metal and/or metal, and further comprising a coating film-forming resin and a specific mixed solvent.

PTL 6 discloses a method for forming a multilayer coating film, the method using a specific effect material-containing base coating composition comprising a coating film-forming resin and colloidal particles containing precious metal and/or metal, and the method being used in combination with a specific coating method.

The coating compositions disclosed in PTL 2 to PTL 6 are solvent-based coating compositions. However, in terms of low environmental impact, aqueous coating compositions have recently been required in the field of metallic coating compositions.

PTL 7 discloses an aqueous base coating composition comprising an effect pigment composed of metal flakes obtained by crushing a vapor-deposition metal film, and an aqueous cellulose derivative having an acid value of 20 to 150 mgKOH/g (solids content), wherein the aqueous cellulose derivative serves as a main binder resin, and the content of the effect pigment is 20 to 70 mass % as PWC.

However, a coating film formed from the coating composition disclosed in PTL 7 had insufficient metallic luster. Further, there is a cost problem because the use of a binder resin is essential.

PTL 8 discloses a method for coating an aqueous base coating composition comprising a flake-effect pigment, the method comprising applying an aqueous base coating composition (A1) adjusted to have a solids content of 20 to 40 wt. % in the coating composition to a substrate so that the dry film thickness is 1 to 15 μm, and then applying an aqueous base coating composition (A2) adjusted to have a solids content of 2 to 15 wt. % in the coating composition to the uncured coating film so that the dry film thickness is 0.1 to 5 μm.

However, despite the recent demand for metallic luster like a mirror-finished surface in which the 60° gloss value is 130 or more, coating films formed by the coating method disclosed in PTL 8 have insufficient metallic luster.

PTL 9 discloses a coating composition, wherein the specular gloss of 20° mirror reflection of a coated article is 300 or more, and the normal reflectance in a visible light region is 40% or more. However, PTL 9 is silent about the anti-water adhesion of the coating film.

CITATION LIST

Patent Literature

PTL 1: JPS63-272544A
PTL 2: JPH11-90318A
PTL 3: JP2003-313500A
PTL 4: JP2005-120249A
PTL 5: JP2009-028690A
PTL 6: JP2009-028693A
PTL 7: JP2009-155537A
PTL 8: JP2006-095522A
PTL 9: JP5685044B

SUMMARY OF INVENTION

Technical Problem

An object of the present invention is to provide a method for forming a multilayer coating film, whereby a metallic coating film having excellent metallic luster and anti-water adhesion can be formed.

Solution to Problem

One embodiment of the present invention provides a method for forming a multilayer coating film by sequentially performing the following steps (1) to (4):

(1) applying a colored coating composition (X) to a substrate to form a colored coating film, (2) applying an effect pigment dispersion (Y) to the colored coating film formed in step (1) to form an effect coating film, (3) applying a clear coating composition (Z) to the effect coating film formed in step (2) to form a clear coating film, and (4) heating the uncured colored coating film, the uncured effect coating film, and the uncured clear coating film formed respectively in steps (1) to (3) to simultaneously cure these three coating films;

wherein the effect pigment dispersion (Y) contains water, a surface modifier (A), a flake-effect pigment (B), and a viscosity modifier (C), the surface modifier (A) has a contact angle of 8 to 20° with respect to a previously degreased tin plate (produced by Paltek Corporation), the contact angle being measured in such a manner that a liquid that is a mixture of isopropanol, water, and the surface modifier (A) at a ratio of 4.5/95/1 is adjusted to have a viscosity of 150 mPa·s measured by a B-type viscometer at a rotor rotational speed of 60 rpm at a temperature of 20° C., 10 µL of the liquid is added dropwise to the tin plate, and the contact angle with respect to the tin plate is measured 10 seconds after dropping, and a film obtained by applying the effect pigment dispersion (Y) to a dry film thickness of 0.2 µm has a light transmittance at a wavelength of 550 nm of 10 to 50%.

Advantageous Effects of Invention

According to the method for forming a multilayer coating film of the present invention, a coating film having an appearance with excellent metallic luster and anti-water adhesion is obtained.

DESCRIPTION OF EMBODIMENTS

1. Step (1)

Step (1) is to apply a colored coating composition (X) to a substrate to form a colored coating film.

Substrate

Examples of the substrate used in the method for forming a multilayer coating film of the present invention include metals, such as iron, zinc, and aluminum; metal materials, such as alloys containing these metals; molded products of these metals; molded products of glass, plastic, foam, and the like. Degreasing treatment or surface treatment can be suitably performed depending on these materials to obtain substrates. Examples of the surface treatment include phosphate treatment, chromate treatment, composite oxide treatment, and the like. Furthermore, when the material of the substrate is metal, it is preferable that an undercoating film is formed on a surface-treated metal material using a cationic electrodeposition coating composition or the like. Moreover, when the material of the substrate is plastic, it is preferable that a primer coating film is formed on a degreased plastic material using a primer coating composition.

Colored Coating Composition (X)

As the colored coating composition (X), a known thermosetting coating composition comprising a vehicle-forming resin, a pigment, and a solvent, such as an organic solvent and/or water, as main components can be specifically used. Examples of the thermosetting coating composition include intermediate coating compositions, base coating compositions, and the like.

Examples of the vehicle-forming resin used in the colored coating composition (X) include thermosetting resins, room-temperature-curable resins, and the like. However, in terms of water resistance, chemical resistance, weather resistance, and the like, thermosetting resins are preferably used. It is preferable to use the vehicle-forming resin in combination with a base resin and a crosslinking agent.

The base resin is preferably a resin that has excellent weather resistance, transparency, and the like. Specific examples include acrylic resins, polyester resins, epoxy resins, urethane resins, and the like.

Examples of acrylic resins include resins obtained by copolymerizing α,β-ethylenically unsaturated carboxylic acids, (meth)acrylic acid esters having a functional group, such as a hydroxyl group, an amide group, or a methylol group, other (meth)acrylic-acid esters, styrene, and the like.

Usable examples of polyester resins include those obtained by the condensation reaction of polybasic acid, polyhydric alcohol, or denatured oil, by a conventional method.

Examples of epoxy resins include epoxy ester resins obtained by a method in which an epoxy ester is synthesized by the reaction of an epoxy group and an unsaturated fatty acid, and an α,β-unsaturated acid is added to this unsaturated group; or by a method in which the hydroxyl group of epoxy ester and a polybasic acid, such as phthalic acid or trimellitic acid, are esterified.

Examples of urethane resins include urethane resins whose molecular weight is increased by reacting an acrylic resin, a polyester resin, or an epoxy resin mentioned above with a dipolyisocyanate compound.

The colored coating composition (X) may be an aqueous coating composition or a solvent-based coating composition. However, in terms of reducing the VOC of the coating composition, the colored coating composition (X) is preferably an aqueous coating composition. When the colored coating composition (X) is an aqueous coating composition, the base resin can be made soluble in water or dispersed in water by using a resin containing a hydrophilic group, such as a carboxyl group, a hydroxyl group, a methylol group, an amino group, a sulfonic acid group, or a polyoxyethylene bond, most generally a carboxyl group, in an amount sufficient for making the resin soluble in water or dispersed in water, and neutralizing the hydrophilic group to form an alkali salt. The amount of the hydrophilic group (e.g., a carboxyl group) used in this case is not particularly limited, and can be suitably selected depending on the degree of water solubilization or water dispersion. However, the amount of the hydrophilic group is generally such that the acid value is about 10 or more mgKOH/g, and preferably 30 to 200 mgKOH/g. Examples of the alkaline substance used in neutralization include sodium hydroxide, amine compounds, and the like.

Moreover, dispersion of the above resin in water can be performed by emulsion polymerization of the above monomer components in the presence of a surfactant and a water-soluble resin. Furthermore, the water dispersion can also be obtained by, for example, dispersing the above resin in water in the presence of an emulsifier. In the water dispersion, the base resin may not contain the above hydrophilic group at all, or may contain the above hydrophilic group in an amount less than the water-soluble resin.

The crosslinking agent is used to crosslink and cure the base resin by heating. Examples include amino resins, polyisocyanate compounds (including unblocked polyisocyanate compounds and blocked polyisocyanate compounds), epoxy-containing compounds, carboxy-containing compounds, carbodiimide group-containing compounds, hydrazide group-containing compounds, semicarbazide group-containing compounds, and the like. Preferable among these are amino resins reactive with a hydroxyl group, polyisocyanate compounds, and carbodiimide group-containing compounds reactive with a carboxyl group. These crosslinking agents can be used singly or in a combination of two or more.

Specifically, amino resins obtained by condensation or co-condensation of formaldehyde with melamine, benzoguanamine, urea, or the like, or further etherification with a lower monohydric alcohol, are suitably used. Further, a polyisocyanate compound can also be suitably used.

The ratio of each component in the colored coating composition (X) may be freely selected as required. However, in terms of water resistance, finish, and the like, it is generally preferable that the ratio of the base resin is 60 to 90 mass %, and particularly 70 to 85 mass %, based on the total mass of both components; and that the ratio of the crosslinking agent is 10 to 40 mass %, and particularly 15 to 30 mass %, based on the total mass of both components.

The pigment provides color and substrate-masking properties to the colored coating film formed from the colored coating composition (X). By adjusting the type and amount of the pigment, the brightness L* value of the coating film obtained from the colored coating composition (X) can be adjusted within the range of 0.1 to 80, preferably 0.1 to 70, and more preferably 0.1 to 60. Examples of the pigment include metallic pigments, rust preventive pigments, coloring pigments, extender pigments, and the like. Of these, coloring pigments are preferably used, and black pigments are more preferably used in terms of obtaining a coating film with excellent substrate-masking properties and metallic luster.

Pigments may be used in a suitable combination depending on light transmittance, substrate-masking properties, desired color, and the like. The amount thereof used is suitably an amount in which the light transmittance of a cured coating film having a film thickness of 15 μm formed from the colored coating composition (X) at a wavelength of 400 to 700 nm is 10% or less, and preferably 5% or less, in terms of substrate-masking properties, weather resistance, and the like.

The light transmittance of the coating film refers to spectral transmittance measured by a recording spectrophotometer (Model EPS-3T, produced by Hitachi, Ltd.) at a wavelength of 400 to 700 nm using, as a sample, a coating film obtained by applying a coating composition to a glass plate so that the cured coating film has a predetermined film thickness, followed by curing, immersion in warm water at 60 to 70° C., removal of the coating film, and drying. When there is a difference in the measured wavelengths (400 to 700 nm), the maximum value is used as light transmittance.

An organic solvent may also be used for the colored coating composition (X), if necessary. Specifically, organic solvents generally used for coating compositions can be used. Examples include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, octanol, cyclohexanol, and diethylene glycol; ketones, such as methyl ethyl ketone, methyl isobutyl ketone, cyclohexanone, and isophorone; and other organic solvents. These can be used singly or in a combination of two or more.

Among the above organic solvents, esters, ethers, alcohols, and ketones are preferable in terms of solubility.

The cured film thickness of the colored coating film obtained from the colored coating composition (X) is 15 μm or more, preferably 15 to 30 μm, and more preferably 15 to 25 μm, in terms of light transmittance, substrate-masking properties, metallic luster, and the like.

Coating of the colored coating composition (X) can be performed by a general method. When the colored coating composition (X) is an aqueous coating composition, for example, deionized water and optionally additives, such as a thickener and an antifoaming agent, are added to the colored coating composition (X) so that the solids content is adjusted to about 10 to 60 mass % and the viscosity is adjusted to 200 to 5000 cps/6 rpm (B-type viscometer). Then, the resultant is applied to the substrate surface by spray coating, rotary atomization coating, or the like. An electrostatic charge may be applied, if necessary, during coating.

The monochrome hiding film thickness of the colored coating composition (X) is preferably 40 μm or less, more preferably 5 to 35 μm, and even more preferably 10 to 30 μm, in terms of color stability. In the present specification, the "monochrome hiding film thickness" is a value obtained in the following manner. The monochrome checkered hiding power test paper specified in 4.1.2 of JIS K5600-4-1 is attached to a steel plate. Then, the coating composition is applied by inclined coating so that the film thickness continuously varies, and dried or cured. The coating surface is then visually observed under diffused daylight, and the minimum film thickness in which the monochrome border of the checker of the hiding power test paper disappears is measured by an electromagnetic film thickness meter. The measured value is the "monochrome hiding film thickness."

2. Step (2)

Step (2) is to apply an effect pigment dispersion (Y) to the colored coating film formed in step (1) to form an effect coating film.

It is preferable that a film obtained by applying the effect pigment dispersion (Y) to a dry film thickness of 0.2 μm have a light transmittance at a wavelength of 550 nm of 10 to 50%, and preferably 20 to 50%, because the coating film to be obtained has excellent metallic luster and water resistance.

When the clear coating composition (Z) is a one-component clear coating composition, the light transmittance at a wavelength of 550 nm of a film obtained by applying the effect pigment dispersion (Y) to a dry film thickness of 0.2 μm is 10 to 50%, preferably 15 to 50%, and more preferably 20 to 50%. When the light transmittance at a wavelength of 550 nm is 10% or more, the coating film to be obtained has excellent metallic luster, even though the dry film thickness of the effect pigment dispersion (Y) is 0.2 μm. When the light transmittance at a wavelength of 550 nm is 50% or less, the coating film to be obtained has excellent water resistance, even though the dry film thickness of the effect pigment dispersion (Y) is 0.2 μm.

When the clear coating composition (Z) is a two-component clear coating composition containing a hydroxy-containing resin and a polyisocyanate compound, the light transmittance at a wavelength of 550 nm of a film obtained by applying the effect pigment dispersion (Y) to a dry film thickness of 0.2 μm is 20 to 50%, preferably 20 to 40%, and more preferably 20 to 30%. When the light transmittance at a wavelength of 550 nm is 20% or more, the coating film to be obtained has excellent metallic luster, even though the dry film thickness of the effect pigment dispersion (Y) is 0.2 μm. When the light transmittance at a wavelength of 550 nm is 50% or less, the coating film to be obtained has excellent water resistance, even though the dry film thickness of the effect pigment dispersion (Y) is 0.2 μm.

The light transmittance refers to transmittance measured by a recording spectrophotometer (Solid Spec 3700, produced by Shimadzu Corp.) at a wavelength of 550 nm using a sample that is a coating film obtained by applying the effect pigment dispersion (Y) to an OHP sheet to a cured coating film thickness of 0.2 μm, followed by drying at 80° C. for 3 minutes.

Effect Pigment Dispersion (Y)

The effect pigment dispersion (Y) contains water, a surface modifier (A), a flake-effect pigment (B), and a viscosity modifier (C).

Surface Modifier (A)

The surface modifier (A) is used to facilitate uniform orientation of a flake-effect pigment (B), described later, dispersed in water on the substrate when the effect pigment dispersion is applied to the substrate.

The surface modifier (A) is not particularly limited, as long as it has a contact angle of 8 to 20°, preferably 9 to 19°, and more preferably 10 to 18°, with respect to a previously degreased tin plate (produced by Paltek Corporation), the contact angle being measured in such a manner that a liquid that is a mixture of isopropanol, water, and the surface modifier (A) at a ratio of 4.5/95/1 is adjusted to have a viscosity of 150 mPa·s measured by a B-type viscometer at a rotor rotational speed of 60 rpm at a temperature of 20° C., 10 μL of the liquid is added dropwise to the tin plate, and the contact angle with respect to the tin plate is measured 10 seconds after dropping. Specifically, the viscosity is controlled by adding Acrysol ASE-60 (trade name, a polyacrylic acid-based viscosity modifier, produced by The Dow Chemical Company, solids content: 28%) and dimethylethanolamine.

The 4.5/95/1 ratio, which is the ratio of isopropanol/ water/surface modifier (A), corresponds to the component ratio of the effect pigment dispersion (Y) for evaluating the surface modifier. The 150 mPa·s viscosity measured by a B-type viscometer at a rotor rotational speed of 60 rpm is a normal value during coating to a substrate. Moreover, the 8 to 20° contact angle with respect to the tin plate represents the wet spreading of liquid under standard coating conditions. When the contact angle is 8° or more, the liquid is applied to a substrate without being overly spread; whereas when the contact angle is 20° or less, the liquid is uniformly applied to a substrate without being overly repelled.

Examples of the surface modifier (A) include silicone-based surface modifiers, acrylic-based surface modifiers, vinyl-based surface modifiers, and fluorine-based surface modifiers. These surface modifiers can be used singly or in a combination of two or more.

Examples of commercial products of the surface modifier (A) include BYK series (produced by BYK-Chemie), Tego series (produced by Evonik), Glanol series and Polyflow series (produced by Kyoeisha Chemical Co., Ltd.), DISPARLON series (produced by Kusumoto Chemicals, Ltd.), and the like.

The surface modifier (A) is preferably a silicone-based surface modifier, in terms of the metallic luster, water resistance, and the like, of the coating film to be obtained. Usable silicone-based surface modifiers include polydimethylsiloxane and modified silicone obtained by modifying polydimethylsiloxane. Examples of modified silicone include polyether-modified silicone, acrylic-modified silicone, polyester-modified silicone, and the like.

The dynamic surface tension of the surface modifier (A) is preferably 50 to 70 mN/m, more preferably 53 to 68 mN/m, and even more preferably 55 to 65 mN/m. In the present specification, the dynamic surface tension refers to a surface tension value measured by the maximum bubble pressure method at a frequency of 10 Hz. The dynamic surface tension was measured using a SITA measuring apparatus (SITA t60, produced by EKO Instruments).

Moreover, the static surface tension of the surface modifier (A) is preferably 15 to 30 mN/m, more preferably 18 to 27 mN/m, and even more preferably 20 to 24 mN/m. In the present specification, the static surface tension refers to a surface tension value measured by the platinum ring method. The static surface tension was measured using a surface tensiometer (DCAT 21, produced by EKO Instruments).

Furthermore, the lamellar length of the surface modifier (A) is preferably 6.0 to 9.0 mm, more preferably 6.5 to 8.5 mm, and even more preferably 7.0 to 8.0 mm.

Flake-Effect Pigment (B)

Examples of the flake-effect pigment (B) in the effect pigment dispersion (Y) include vapor-deposition metal flake pigments, aluminum flake pigments, light interference pigments, and the like. Of these, vapor-deposition metal flake pigments are preferred, in terms of obtaining a coating film with excellent metallic luster.

The vapor-deposition metal flake pigment is obtained by vapor-depositing a metal film on a base material, removing the base material, and then grinding the vapor-deposition metal film. Examples of the base material include films and the like.

The material of the above metal is not particularly limited. Examples include aluminum, gold, silver, copper, brass, titanium, chromium, nickel, nickel chromium, stainless steel, and the like. Of these, aluminum or chromium is particularly preferable, in terms of easy availability, ease of handling, and the like. In the present specification, a vapor-deposition metal flake pigment obtained by vapor deposition of aluminum refers to a "vapor-deposition aluminum flake pigment," and a vapor-deposition metal flake pigment obtained by vapor deposition of chromium refers to a "vapor-deposition chromium flake pigment."

Examples of commercial products that can be used as the vapor-deposition aluminum flake pigment include "METALURE" series (trade name, produced by ECKART), "Hydroshine WS" series (trade name, produced by ECKART), "Decomet" series (trade name, produced by Schlenk), "Metasheen" series (trade name, produced by BASF), and the like.

Examples of commercial products that can be used as the vapor-deposition chromium flake pigment include "Metalure Liquid Black" series (trade name, produced by ECKART) and the like.

The average thickness of the vapor-deposition metal flake pigment is preferably 0.01 to 1.0 μm, and more preferably 0.015 to 0.1 μm.

The average particle size (D50) of the vapor-deposition metal flake pigment is preferably 1 to 50 μm, and more preferably 5 to 20 μm.

The surface of the vapor-deposition aluminum flake pigment is preferably treated with silica, in terms of obtaining a coating film with excellent storage stability and metallic luster.

Aluminum flake pigments are generally produced by grinding or milling aluminum in a ball mill or an attritor mill in the presence of a grinding liquid medium using a grinding aid. For coating compositions, aluminum flake pigments having an average particle size (D50) of about 1 to 50 μm, particularly about 5 to 20 μm, are generally used, in terms of the stability in the coating composition, and the finish of the coating film to be formed. The above-mentioned average particle size means a major axis. Usable grinding aids include higher fatty acids, such as oleic acid, stearic acid, isostearic acid, lauric acid, palmitic acid, and myristic acid; as well as aliphatic amine, aliphatic amide, and aliphatic alcohol. As the grinding liquid medium, an aliphatic hydrocarbon, such as mineral spirit, is used.

Viscosity Modifier (C)

As the viscosity modifier (C) in the effect pigment dispersion (Y), a known viscosity modifier can be used. Examples include silica-based fine powder, mineral-based viscosity modifiers, barium sulfate atomization powder, polyamide-based viscosity modifiers, organic resin fine particle viscosity modifiers, diurea-based viscosity modifiers, urethane association-type viscosity modifiers, polyacrylic acid-based viscosity modifiers, which are acrylic swelling-type, cellulose-based viscosity modifiers, and the like. Of these, in terms of obtaining a coating film with excellent metallic luster, it is particularly preferable to use a mineral-based viscosity modifier, a polyacrylic acid-based viscosity modifier, or a cellulose-based viscosity modifier.

Examples of mineral-based viscosity modifiers include swelling laminar silicate that has a 2:1 type crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; and vermiculite; or substitution products and derivatives thereof, or mixtures thereof.

Examples of polyacrylic acid-based viscosity modifiers include sodium polyacrylate, polyacrylic acid-(meth)acrylic acid ester copolymers, and the like.

Examples of commercial products of the polyacrylic acid-based viscosity modifier include "Primal ASE-60," "Primal TT615," and "Primal RM5" (trade names, produced by The Dow Chemical Company); "SN Thickener 613," "SN Thickener 618," "SN Thickener 630," "SN Thickener 634," and "SN Thickener 636" (trade names, produced by San Nopco Limited); and the like. The acid value of the solids content of the polyacrylic acid-based viscosity modifier is 30 to 300 mgKOH/g, and preferably 80 to 280 mgKOH/g.

Examples of cellulose-based viscosity modifiers include carboxymethylcellulose, methylcellulose, hydroxyethylcellulose, hydroxyethylmethylcellulose, hydroxypropylmethylcellulose, methylcellulose, cellulose nanofiber gel, and the like. Of these, cellulose nanofiber gel is particularly preferable, because the coating film to be obtained has excellent metallic luster. Examples of commercial products thereof include "Rheocrysta" (trade name, produced by DKS Co. Ltd.) and the like.

These viscosity modifiers can be used singly or in a suitable combination of two or more.

Other Components

In particular, when the effect pigment dispersion (Y) contains an aluminum pigment, it is preferable that the effect pigment dispersion (Y) contain a phosphate group-containing resin, in terms of the metallic luster and water resistance of the coating film to be obtained.

The phosphate group-containing resin can be produced by, for example, copolymerizing a phosphate group-containing polymerizable unsaturated monomer and other polymerizable unsaturated monomers by a known method, such as a solution-polymerization method. Examples of the phosphate group-containing polymerizable unsaturated monomer include acid phosphooxy ethyl(meth)acrylate, acid phosphooxy propyl(meth)acrylate, a reaction product of glycidyl (meth)acrylate and alkyl phosphoric acid, and the like. These may be used singly or in a combination of two or more.

In the phosphate group-containing resin, when the above phosphate group-containing polymerizable unsaturated monomer and another polymerizable unsaturated monomer are copolymerized, the ratio of each monomer used is such that the mass ratio of the former monomer to the latter monomer is preferably about 1/99 to 40/60, more preferably about 5/95 to 35/65, and even more preferably about 10/90 to 30/70.

The effect pigment dispersion (Y) may further suitably contain, if necessary, an organic solvent, a pigment other than the flake-effect pigment (B), a pigment dispersant, an antisettling agent, an antifoaming agent, an ultraviolet absorber, a surface modifier other than the surface modifier (A), or the like.

The effect pigment dispersion (Y) may contain a base resin and a dispersion resin, in terms of the adhesion and storage stability of the coating film to be obtained. However, the effects of the present invention can be exhibited even if these resins are not substantially contained.

Examples of the base resin include acrylic resins, polyester resins, alkyd resins, urethane resins, and the like.

As the dispersion resin, existing dispersion resins, such as acrylic resins, epoxy resins, polycarboxylic acid resins, and polyester resins, can be used.

Crosslinkable Component (D)

The effect pigment dispersion (Y) may contain a crosslinkable component (D), in terms of the anti-water adhesion of the coating film to be obtained. In particular, when a clear coating composition (Z), described later, does not contain the cross-linking component (D), it is necessary for the effect pigment dispersion (Y) to contain the crosslinkable component (D).

In the present specification, the crosslinkable component (D) is selected from the group consisting of melamine, a melamine derivative, (meth)acrylamide, a copolymer of N-methylol group- or N-alkoxymethyl group-containing (meth)acrylamide, and a blocked or unblocked polyisocyanate compound.

Examples of melamine derivatives include partially etherified or fully etherified melamine resins produced by etherifying a part or all of methylol groups in methylolated melamine with a $C_{1-8}$ monohydric alcohol, such as methyl alcohol, ethyl alcohol, n-propyl alcohol, i-propyl alcohol, n-butyl alcohol, i-butyl alcohol, 2-ethylbutanol, or 2-ethylhexanol.

Examples of commercially available melamine derivatives include Cymel 202, Cymel 232, Cymel 235, Cymel 238, Cymel 254, Cymel 266, Cymel 267, Cymel 272, Cymel 285, Cymel 301, Cymel 303, Cymel 325, Cymel 327, Cymel 350, Cymel 370, Cymel 701, Cymel 703, and Cymel 1141 (all produced by Nihon Cytec Industries Inc.); U-Van 20SE60, U-Van 122, and U-Van 28-60 (all produced by Mitsui Chemicals, Inc.); Super Beckamine J-820-60, Super Beckamine L-127-60, and Super Beckamine G-821-60 (all produced by DIC); and the like.

The above melamine and melamine derivatives may be used singly or in a combination of two or more.

Examples of the N-methylol group- or N-alkoxymethyl group-containing (meth)acrylamide include (meth)acrylamides, such as N-methylolacrylamide, N-methoxymethylacrylamide, N-methoxybutylacrylamide, and N-butoxymethyl(meth)acrylamide.

The above (meth)acrylamide derivatives may be used singly or in a combination of two or more.

The unblocked polyisocyanate compound is a compound having at least two isocyanate groups per molecule. Examples include aliphatic polyisocyanates, alicyclic polyisocyanates, aliphatic-aromatic polyisocyanates, aromatic polyisocyanates, derivatives of these polyisocyanates, and the like.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and 2,6-diisocyanatomethyl hexanoate (common name: lysine diisocyanate); aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyldiisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; aromatic tetraisocyanates, such as 4,4'-diphenylmethane-2,2',5,5'-tetraisocyanate; and the like. Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanates. These polyisocyanate derivatives may be used singly or in a combination of two or more.

The above polyisocyanates and derivatives thereof may be used singly or in a combination of two or more.

Among the aliphatic diisocyanates, hexamethylene diisocyanate compounds are preferably used, and among the alicyclic diisocyanates, 4,4'-methylenebis(cyclohexylisocyanate) is preferably used. Of these, derivatives of hexamethylene diisocyanate are particularly the most preferable, in terms of adhesion, compatibility, and the like.

As the polyisocyanate compound, it is also possible to use a prepolymer formed by reacting the polyisocyanate or a derivative thereof with a compound having active hydrogen, such as hydroxy or amino, and reactive to the polyisocyanate under conditions such that the isocyanate groups are present in excess. Examples of the compound reactive to the polyisocyanate include polyhydric alcohols, low-molecular-weight polyester resins, amine, water, and the like.

The above polyisocyanate compounds may be used singly or in a combination of two or more.

The blocked polyisocyanate compound is a blocked polyisocyanate compound in which some or all of the isocyanate groups of the above polyisocyanate or a derivative thereof are blocked with a blocking agent.

Examples of the blocking agents include phenol compounds, such as phenol, cresol, xylenol, nitrophenol, ethylphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, acetic acid amide, stearic acid amide, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamate esters, such as phenyl N-phenylcarbamate; imines, such as ethyleneimine and propyleneimine; sulfites, such as sodium bisulfite and potassium bisulfite; azole-based compounds; and the like. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When blocking is performed (a blocking agent is reacted), it can be performed by adding a solvent, if necessary. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents.

The above blocked polyisocyanate compounds can be used singly or in a combination of two or more.

When the effect pigment dispersion (Y) contains a crosslinkable component (D), the content thereof as a solids content is preferably within the range of 10 to 100 parts by mass, more preferably 15 to 95 parts by mass, and even more preferably 20 to 100 parts by mass, based on 100 parts by mass of the solids content of the flake-effect pigment (B) in the effect pigment dispersion (Y), in terms of the anti-water adhesion of the coating film.

When the effect pigment dispersion (Y) contains a base resin and a dispersion resin described above, and further contains a crosslinkable component (D), the total amount as a solids content of the base resin, the dispersion resin, and the crosslinkable component (D) is, in terms of forming a coating film with metallic luster, preferably within the range of 0.1 to 500 parts by mass, more preferably 1 to 300 parts by mass, and even more preferably 10 to 100 parts by mass, based on 100 parts by mass of the solids content of the flake-effect pigment (B) in the effect pigment dispersion (Y), in terms of the anti-water adhesion of the coating film.

When the effect pigment dispersion (Y) contains a base resin and/or a crosslinkable component (D), the ratio of the flake-effect pigment to the total amount of the base resin and the crosslinking agent is preferably within the range of 1/1 to 100/1, more preferably 3/1 to 50/1, and even more preferably 5/1 to 10/1, based on the solids content mass.

Amount of Each Component in Effect Pigment Dispersion (Y)

The proportion (solids content mass) of water, the surface modifier (A), the flake-effect pigment (B), and the viscosity modifier (C) in the effect pigment dispersion (Y) is preferably within the following range, in terms of obtaining a coating film with excellent metallic luster.

The amount of each component based on 100 parts by mass of the total amount of water, the surface modifier (A), the flake-effect pigment (B), and the viscosity modifier (C) is as follows:

water: 70 to 99 parts by mass, preferably 80 to 99 parts by mass, and more preferably 90 to 99 parts by mass;

surface modifier (A): 0.1 to 10 parts by mass, preferably 0.2 to 8 parts by mass, and more preferably 0.4 to 6 parts by mass:

flake-effect pigment (B): 0.05 to 3.0 parts by mass, preferably 0.2 to 1.5 parts by mass, and more preferably 0.3 to 0.6 parts by mass; and viscosity modifier (C): 0.1 to 26 parts by mass, preferably 0.5 to 10 parts by mass, and more preferably 1.0 to 5.0 parts by mass.

Contact Angle of Effect Pigment Dispersion (Y)

The contact angle of the effect pigment dispersion (Y) is 8 to 20°, and preferably 10 to 18°, in terms of obtaining a coating film with excellent metallic luster. The contact angle meter used in this case is CA-X150 (produced by Kyowa Chemical Industry Co., Ltd.). The viscosity of the effect pigment dispersion (Y) measured by a B-type viscometer at a rotor rotational speed of 60 rpm is adjusted to 150 mPa·s, 10 μL is added dropwise to a previously degreased tin plate (produced by Paltek Corporation), and the viscosity is measured 10 seconds after dropping. The measured value refers to the contact angle.

Step (2) of the present invention is to apply the effect pigment dispersion (Y) to the above substrate to form an effect coating film.

Coating of Effect Pigment Dispersion (Y)

The effect pigment dispersion (Y) is prepared by mixing and dispersing the above components. In terms of obtaining a coating film with excellent metallic luster, the solids content during coating is preferably adjusted to 0.1 to 15 mass %, and more preferably 0.2 to 5.0 mass %, based on the effect pigment dispersion (Y).

The viscosity of the effect pigment dispersion (Y) at a temperature of 20° C. measured by a B-type viscometer at 60 rpm after 1 minute (also referred to as "the B60 value" in the present specification) is preferably 60 to 1500 mPa·s, more preferably 60 to 1000 mPa·s, and even more preferably 60 to 500 mPa·s, in terms of obtaining a coating film with excellent metallic luster. The viscometer used in this case is a B-type viscometer (trade name: LVDV-I, produced by Brookfield).

The effect pigment dispersion (Y) can be applied by a method such as electrostatic spraying, air spray coating, or airless spray coating. In the method for forming a multilayer coating film of the present invention, rotary atomization type electrostatic spraying is particularly preferable.

It is preferable that the effect coating film obtained by applying the effect pigment dispersion (Y) is dried. The method of drying the effect coating film is not particularly limited. For example, a method that allow the coating film to stand at ordinary temperature for 15 to 30 minutes, a method that performs preheating at a temperature of 50 to 100° C. for 30 seconds to 10 minutes, or the like, can be used.

The film thickness 30 seconds after the effect pigment dispersion (Y) is attached to the substrate is preferably 3 to 25 μm, more preferably 4 to 24 μm, and even more preferably 5 to 23 μm, in terms of obtaining a coating film with excellent metallic luster.

The thickness of the effect coating film, as dry film thickness, is preferably 0.02 to 5.0 μm, more preferably 0.02 to 4.0 μm, and even more preferably 0.02 to 3.5 μm, in terms of obtaining a coating film with excellent metallic luster.

In particular, when the flake-effect pigment (B) in the effect pigment dispersion (Y) is a vapor-deposition metal-flake pigment, the thickness of the effect coating film, as dry film thickness, is preferably 0.01 to 1.0 µm, and more preferably 0.01 to 0.5 µm. For example, the thickness of the effect coating film, as dry film thickness, is 0.01 or more and less than 0.5 µm.

3. Step (3)

Step (3) is to apply a clear coating composition (Z) to the effect coating film formed in step (2) to form a clear coating film.

Clear Coating Composition (Z)

The clear coating composition (Z) may be a one-component clear coating composition containing a base resin and a curing agent, or a two-component clear coating composition having a hydroxy-containing resin and a polyisocyanate compound. The polyisocyanate compound is as described in the "Effect pigment dispersion (Y)" section.

Examples of combinations of a base resin and a curing agent in the one-component clear coating composition include a carboxy-containing resin and an epoxy-containing resin, a hydroxy-containing resin and a blocked polyisocyanate compound, a hydroxy-containing resin and a melamine resin, and the like. When a one-component coating composition is used as the clear coating composition (Z), the clear coating composition (Z) preferably contains a crosslinkable component (D) in terms of the anti-water adhesion of the coating film to be obtained. In particular, when the effect pigment dispersion (Y) does not contain the crosslinkable component (D), it is necessary that the clear coating composition (Z) contain the crosslinkable component (D).

As the hydroxy-containing resin, conventionally known resins can be used without limitation, as long as they are resins containing a hydroxyl group. Examples of the hydroxy-containing resin include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mgKOH/g, and more preferably 100 to 180 mgKOH/g. When the hydroxy value is 80 mgKOH/g or more, the crosslinking density is high, and thus the scratch resistance is sufficient. Further, when the hydroxy value is 200 mgKOH/g or less, the water resistance of the coating film is maintained.

The weight average molecular weight of the hydroxy-containing acrylic resin is preferably within the range of 2500 to 40000, and more preferably 5000 to 30000. When the weight average molecular weight is 2500 or more, the coating film performance, such as acid resistance, is excellent. When the weight average molecular weight is 40000 or less, the smoothness of the coating film is maintained, and thus the finish is excellent.

In the present specification, the weight average molecular weight refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names, all produced by Tosoh Corporation) under the following conditions: mobile phase: tetrahydrofuran, measuring temperature: 40° C., flow rate: 1 cc/min, and detector: RI.

The glass transition temperature of the hydroxy-containing acrylic resin is −40° C. to 20° C., and particularly preferably −30° C. to 10° C. When the glass transition temperature is −40° C. or more, the coating film hardness is sufficient. When the glass transition temperature is 20° C. or less, the coating surface smoothness of the coating film is maintained.

As the crosslinkable component (D), those described in the "Effect Pigment Dispersion (Y)" section can be used.

When the clear coating composition (Z) contains the crosslinkable component (D), the content thereof as a solids content is preferably within the range of 5 to 25 parts by mass, more preferably 10 to 20 parts by mass, and even more preferably 15 to 18 parts by mass, based on 100 parts by mass of the resin solids content of the clear coating composition (Z), in terms of the anti-water adhesion of the coating film.

The clear coating composition (Z) may suitably contain additives, such as solvents (e.g., water and organic solvents), curing catalysts, antifoaming agents, and ultraviolet absorbers, if necessary.

The clear coating composition (Z) may suitably contain a coloring pigment within a range that does not impair transparency. As the coloring pigment, conventionally known pigments for ink or coating compositions can be used singly or in a combination of two or more. The amount thereof to be added may be suitably determined, but is preferably 30 parts by weight or less, and more preferably 0.01 to 10 parts by weight, based on 100 parts by mass of the vehicle-forming resin composition in the clear coating composition (Z).

The form of the clear coating composition (Z) is not particularly limited. The clear coating composition (Z) is generally used as an organic solvent-based coating composition. Examples of the organic solvent used in this case include various organic solvents for coating compositions, such as aromatic or aliphatic hydrocarbon solvents, ester solvents, ketone solvents, ether solvents, and the like. As the organic solvent used herein, the one used in the preparation of the hydroxy-containing resin may be used as is, or other organic solvents may be further suitably added.

The clear coating composition (Z) can be prepared by mixing a hydroxy-containing resin, a polyisocyanate compound, and optionally a curing catalyst, a pigment, various resins, an ultraviolet absorber, a light stabilizer, an organic solvent, and the like, by a known method.

The solids concentration of the clear coating composition (Z) is preferably about 30 to 70 mass %, and more preferably about 40 to 60 mass %.

The clear coating composition (Z) is applied to the effect coating film. The coating of the clear coating composition (Z) is not particularly limited, and the same method as those for the colored coating composition (X) and the effect pigment dispersion (Y) may be used. For example, the clear coating composition (Z) can be applied by a coating method, such as air spray coating, airless spray coating, rotary atomization coating, or curtain coating. In these coating methods, an electrostatic charge may be applied, if necessary. Among these, rotary atomization coating using an electrostatic charge is preferable. The coating amount of the clear coating composition (Z) is generally preferably an amount in which the cured film thickness is about 10 to 50 µm.

Moreover, when the clear coating composition (Z) is applied, it is preferable to suitably adjust the viscosity of the clear coating composition (Z) within a viscosity range suitable for the coating method. For example, for rotary atomization coating using an electrostatic charge, it is preferable to suitably adjust the viscosity of the clear coating composition (Z) within a range of about 15 to 60 seconds measured by a Ford cup No. 4 viscometer at 20° C. using a solvent, such as an organic solvent.

After the clear coating composition (Z) is applied to form a clear coating film, for example, preheating can be performed at a temperature of about 50 to 80° C. for about 3 to 10 minutes so as to promote the vaporization of volatile components.

4. Step (4)

Step (4) is to heat the uncured colored coating film, the uncured effect coating film, and the uncured clear coating film formed in steps (1) to (3) to simultaneously cure these three coating films.

Heating can be performed by a known means. For example, a drying furnace, such as a hot-blast stove, an electric furnace, or an infrared beam heating furnace, can be used.

The heating temperature is preferably within the range of 70 to 150° C., and more preferably 80 to 140° C.

The heating time is not particularly limited, but is preferably within the range of 10 to 40 minutes, and more preferably 20 to 30 minutes.

EXAMPLES

The present invention is described in more detail below with reference to Examples and Comparative Examples. However, the present invention is not limited only to these Examples. "Part(s)" and "%" are both based on mass.

Test Example 1

1. Surface Modifier (A)

Table 1 shows the properties of surface modifiers (A) used in the production of effect pigment dispersions (Y) described later.

(A-1) to (A-4) are all commercially available surface modifiers. (A-1) is a silicone-based surface modifier, (A-2) is a mixture of a surface modifier of an amphiphilic oligomer and a silicone-based surface modifier, (A-3) is polyether-based siloxane, and (A-4) is a fluorine-modified acrylic surface modifier.

TABLE 1

| Name | (A-1) | (A-2) | (A-3) | (A-4) |
|---|---|---|---|---|
| Contact angle [°] (Note 1) | 13 | 12 | 14 | 39 |
| Dynamic surface tension [mN/m] | 63.9 | 51.5 | 68.7 | 71.3 |
| Static surface tension [mN/m] | 22.2 | 21.6 | 21.9 | 38.8 |
| Lamellar length [mm] | 7.45 | 7.40 | 7.46 | 7.55 |

(Note 1):
A contact angle with respect to a previously degreased tin plate (produced by Paltek Corporation) measured in such a manner that a liquid prepared by mixing isopropanol, water, and the surface modifier (A) at a ratio of 4.5/95/1 was adjusted to have a viscosity of 100 mPa·s measured by a B-type viscometer at a rotor rotational speed of 60 rpm at a temperature of 20° C., 10 μL of the liquid was added dropwise to the tin plate, and the contact angle with respect to the tin plate was measured by a contact angle meter (CA-X150, trade name, produced by Kyowa Chemical Industry Co., Ltd.) 10 seconds after dropping.

2. Production of Phosphate Group-Containing Resin

A mixed solvent of 27.5 parts of methoxy propanol and 27.5 parts of isobutanol was placed in a reaction vessel equipped with a thermometer, a thermostat, a stirrer, a reflux condenser, and a dropping funnel, and heated to 110° C. While the temperature was maintained at 110° C., 121.5 parts of a mixture comprising 25 parts of styrene, 27.5 parts of n-butyl methacrylate, 20 parts of branched higher alkyl acrylate (trade name: "Isostearyl Acrylate," produced by Osaka Organic Chemical Industry Ltd.), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol, and 4 parts of tert-butylperoxy octanoate was added dropwise to the above mixed solvent over 4 hours. Further, a mixture comprising 0.5 parts of tert-butylperoxy octanoate and 20 parts of isopropanol was added dropwise for 1 hour. Then, the resultant was stirred and aged for 1 hour, thereby obtaining a phosphate group-containing resin solution having a solids content of 50%. The phosphate group-containing resin had an acid value of 83 mgKOH/g, a hydroxy value of 29 mgKOH/g, and a weight average molecular weight of 10,000.

Phosphate group-containing polymerizable monomer: 57.5 parts of monobutyl phosphoric acid and 41 parts of isobutanol were placed in a reaction vessel equipped with a thermometer, a thermostat, a stirrer, a reflux condenser, and a dropping funnel, and heated to 90° C. After 42.5 parts of glycidyl methacrylate was added dropwise over 2 hours, the mixture was stirred and aged for 1 hour. Thereafter, 59 parts of isopropanol was added, thereby obtaining a phosphate group-containing polymerizable monomer solution having a solids content of 50%. The acid value of the obtained monomer was 285 mgKOH/g.

3. Production of Effect Pigment Dispersion (Y)

Production Example 1

92 parts of distilled water, 1 part of the surface modifier (A-2), 5 parts (solids content of 0.5 parts) of Hydroshine WS-3004 (an aqueous vapor-deposition aluminum flake pigment, produced by Eckart, solids content: 10%; internal solvent: isopropanol, average particle size D50: 13 μm, thickness: 0.05 μm; the surface was treated with silica), 1.7 parts (solids content of 0.48 parts) of Acrysol ASE-60 (a polyacrylic acid-based viscosity modifier, produced by The Dow Chemical Company, solids content: 28%), and 0.17 parts of dimethylethanolamine were blended, stirred, and mixed, thereby preparing an effect pigment dispersion (Y-1).

Production Examples 2 to 15

Effect pigment dispersions (Y-2) to (Y-16) were obtained in the same manner as in Production Example 1, except that the formulations shown in Table 2 were used.

TABLE 2

Numerical values in parentheses in the table are solids contents.

| | | | | Production Example No. | | | | | | | |
|---|---|---|---|---|---|---|---|---|---|---|---|
| | | | | 1 | 2 | 3 | 4 | 5 | 6 | 7 | 8 |
| | Name of effect pigment dispersion | | | Y-1 | Y-2 | Y-3 | Y-4 | Y-5 | Y-6 | Y-7 | Y-8 |
| Formulation | Water | Distilled water | | 92 | 92 | 91 | 91 | 94 | 91 | 93 | 92 |
| | Surface modifier | Surface modifier (A) | A-1 | | 1 | 0.8 | | 1 | 1 | 1 | 1 |
| | | | A-2 | 1 | | | | | | | |
| | | | A-3 | | | | 1 | | | | |
| | | Surface modifier other than surface modifier (A) | A-4 | | | | | | | | |
| | Effect pigment (B) | Vapor-deposition aluminum flake | WS3004 | 5 (0.5) | 5 (0.5) | 5 (0.5) | 5 (0.5) | 3 (0.3) | 6 (0.6) | 5 (0.5) | 5 (0.5) |
| | Viscosity modifier | ASE-60 | | 1.7 (0.48) | 1.7 (0.48) | 1.7 (0.48) | 1.7 (0.48) | 1.7 (0.48) | 1.7 (0.48) | 1.2 (0.34) | 0.9 (0.25) |
| | (C) | Dimethylethanolamine | | 0.17 | 0.17 | 0.17 | 0.17 | 0.17 | 0.17 | 0.15 | 0.75 |
| Performance | Light transmittance at a wavelength of 550 nm when the film thickness of the effect coating film is 0.2 μm (%) | | | 20 | 25 | 30 | 25 | 50 | 20 | 25 | 25 |
| | Coating composition viscosity B60 value (mPa · s) | | | 150 | 150 | 150 | 150 | 150 | 150 | 60 | 1500 |
| | Concentration of effect pigment (B) in coating composition (%) | | | 0.5 | 0.5 | 0.5 | 0.5 | 0.5 | 0.6 | 0.5 | 0.5 |

| | | | | Production Example No. | | | | | | | |
|---|---|---|---|---|---|---|---|---|---|---|---|
| | | | | 9 | 10 | 11 | 12 | 13 | 14 | 15 | 16 |
| | Name of effect pigment dispersion | | | Y-9 | Y-10 | Y-11 | Y-12 | Y-13 | Y-14 | Y-15 | Y-16 |
| Formulation | Water | Distilled water | | 96 | 74 | 88 | 93 | 92 | 92 | 90 | 90 |
| | Surface modifier | Surface modifier (A) | A-1 | 1 | 1 | 10 | 0.1 | 1 | | 1 | 1 |
| | | | A-2 | | | | | | | | |
| | | | A-3 | | | | | | | | |
| | | Surface modifier other than surface modifier (A) | A-4 | | | | | | 1 | | |
| | Effect pigment (B) | Vapor-deposition aluminum flake | WS3004 | 0.75 (0.075) | 24 (2.4) | 5 (0.5) | 5 (0.5) | 5 (0.5) | 5 (0.5) | 7.3 (0.73) | 7.3 (0.73) |
| | Viscosity modifier | ASE-60 | | 1.7 (0.48) | 1.7 (0.48) | 1.7 (0.48) | 1.7 (0.48) | 1.7 (0.48) | 1.7 (0.48) | 1.7 (0.48) | 1.0 (0.28) |
| | (C) | Dimethylethanolamine | | 0.17 | 0.17 | 0.17 | 0.17 | 0.17 | 0.17 | 0.17 | 0.8 |
| | | Phosphate group-containing resin | | | | | | 0.9 (0.45) | | | |
| Performance | Light transmittance at a wavelength of 550 nm when the film thickness of the effect coating film is 0.2 μm (%) | | | 25 | 25 | 25 | 25 | 25 | 55 | 95 | 25 |
| | Coating composition viscosity B60 value (mPa · s) | | | 150 | 150 | 150 | 150 | 150 | 150 | 150 | 1600 |
| | Concentration of effect pigment (B) in coating composition (%) | | | 0.075 | 2.4 | 0.5 | 0.5 | 0.5 | 0.5 | 0.73 | 0.73 |

4. Preparation of Substrate

Production of Substrate 1

A cationic electrodeposition coating composition "Elecron 9400HB" (trade name, produced by Kansai Paint Co., Ltd., an amine-modified epoxy resin-based cationic resin containing a blocked polyisocyanate compound as a curing agent) was applied by electrodeposition to a degreased and zinc phosphate-treated steel plate (JISG3141, size: 400× 300×0.8 mm) to a film thickness of 20 μm when cured. The resulting film was heated at 170° C. for 20 minutes to be cured by crosslinking, thereby obtaining a substrate 1.

Production of Substrate 2

A primer "Soflex 1000" (trade name, produced by Kansai Paint Co., Ltd., a polyolefin-containing electrically conductive organic solvent-based coating composition) was applied to an ABS plate (black, degreased) by air spray coating to a dry film thickness of 15 μm. The resulting film was heated at 80° C. for 30 minutes to be cured, thereby obtaining a substrate 2.

5. Preparation of Test Plate

Example 1

A colored coating composition (X-1) "WP-522H N-2.0" (trade name, produced by Kansai Paint Co., Ltd., a polyester resin-based aqueous intermediate coating composition, L* value of the coating film to be obtained: 20) was applied to the substrate 1 to a cured film thickness of 20 μm by electrostatic spraying using a rotary atomization-type bell-shaped coating device. After the resulting film was allowed to stand for 3 minutes, preheating was performed at 80° C. for 3 minutes. Further, the effect pigment dispersion (Y-1) produced as described above was adjusted to have a coating composition viscosity shown in Table 2, and applied to a dry coating film thickness of 0.1 μm using a robot bell (produced by ABB) under the conditions in which the booth temperature was 23° C. and the humidity was 68%. The resultant was then allowed to stand at 80° C. for 3 minutes. Subsequently, the dried coating surface was coated with a clear coating composition (Z-1) "KINO6500" (trade name, produced by Kansai Paint Co., Ltd., a hydroxy/isocyanate curable acrylic resin/urethane resin-based two-component organic solvent-based coating composition) to a dry coating film thickness of 25 to 35 μm using a robot bell (produced by ABB) under the conditions in which the booth temperature was 23° C. and the humidity was 68%. After coating, the resultant was allowed to stand at room temperature for 15 minutes, and then heated in a hot air circulation-type dryer at 140° C. for 30 minutes to simultaneously dry the multilayer coating films, thereby obtaining a test plate.

The film thickness of the dry coating film shown in Table 3 was calculated from the following formula. The same applies to the following Examples.

$x = sc/sg/S*10000$ x: film thickness [μm]
sc: coating solids content [g]
sg: coating film specific gravity [g/cm$^3$]
S: evaluation area of coating solids content [cm$^2$]

Examples 2 to 15 and Comparative Examples 1 to 4

Test plates were obtained in the same manner as in Example 1, except that the substrates and coating compositions shown in Table 3 were used.

The clear coating composition (Z-2) in the table is "KINO1210" (trade name: Kansai Paint Co., Ltd., an acid/epoxy curable acrylic resin-based one-component organic solvent-based coating composition).

6. Evaluation of Coating Film

The appearance and performance of the coating film of each test plate obtained in the above manner were evaluated. Table 3 shows the results.

Evaluation of Appearance

The coating film appearance was evaluated by graininess, anti-water adhesion, specular gloss (60° gloss), and visual observation.

Graininess

The graininess was evaluated as a hi-light graininess value (hereinafter abbreviated as the "HG value"). The HG value is a parameter of micro-brilliance obtained by the microscopic observation of a coating surface, and indicates the graininess in the highlight. The HG value is calculated as follows. First, the coating surface is photographed with a CCD camera at a light incidence angle of 15° and a receiving angle of 0°, and the obtained digital image data (two-dimensional brilliance distribution data) is subjected to two-dimensional Fourier transformation to obtain a power spectrum image. Subsequently, only the spatial frequency area corresponding to graininess is extracted from the power spectrum image, and the obtained measurement parameter is converted to an HG value from 0 to 100 that has a linear relation with graininess. An HG value of 0 indicates no graininess of the effect pigment at all, and an HG value of 100 indicates the highest possible graininess of the effect pigment.

The graininess HG is preferably 10 to 40, in terms of the denseness of the metallic coating film.

Anti-Water Adhesion

Each test plate was immersed in warm water at 80° C. for 5 hours. After the test plate was removed from the water, cross-cuts reaching the substrate were made in the multilayer coating film of the test plate using a cutter knife to form a grid of 100 squares (2 mm×2 mm). Subsequently, adhesive cellophane tape was applied to the surface of the grid portion, and the tape was peeled off rapidly at 20° C. Then, the condition of squares remaining was checked, and anti-water adhesion was evaluated according to the following criteria. "Pass" is regarded as acceptance.

Pass: 100 squares of the coating film remained, and no small edge-chipping of the coating film occurred at the edge of the cut made by the cutter knife.

Fail: The remaining number of squares of the coating film was 99 or less.

Specular Gloss (60° Gloss)

The 60° gloss value of the test plates obtained above was measured using a gloss meter (micro-TRI-gloss, produced by BYK-Gardner). A numerical value of 130 or more is regarded as acceptance.

When the 60-degree specular gloss of a multilayer coating film obtained by forming an effect coating film on a colored coating film, and further forming a coating film thereon is 150 to 240 degrees, it is preferable in terms of high glossiness.

Visual Feeling of Metal

The test plates obtained above were each observed outdoor on a fine day while changing the angle of the test plate against outdoor light, and graininess and the luminance difference (flip-flop property: FF property) between the highlight region and the shade region were evaluated. Less graininess and a higher flip-flop property indicate that the coating film has excellent metal tone. The evaluation was conducted on a five-grade scale by 2 designers and 3 engineers (total: 5 persons) who had been engaged in color development for 3 years or more, and the average value was employed.

5: Reflection of sunlight is very strong, and the blue sky is reflected on the coated plate. Graininess is very small and the FF property is very high.
4: Reflection of sunlight is strong. Graininess is very small and the flip-flop property is very high.
3: Reflection of sunlight is strong. Graininess is small and the flip-flop property is high.
2: Reflection of sunlight is weak. Graininess is large and the flip-flop property is low.
1: Reflection of sunlight is weak. Graininess is very large and the FF property is very low.

TABLE 3

| | Examples | | | | | | | | | |
|---|---|---|---|---|---|---|---|---|---|---|
| | 1 | 2 | 3 | 4 | 5 | 6 | 7 | 8 | 9 | 10 |
| Name of substrate | 1 | 1 | 1 | 1 | 1 | 1 | 1 | 1 | 1 | 1 |
| Name of colored coating composition (X) | X-1 | X-1 | X-1 | X-1 | X-1 | X-1 | X-1 | X-1 | X-1 | X-1 |
| Name of effect dispersion (Y) | Y-1 | Y-2 | Y-3 | Y-4 | Y-5 | Y-6 | Y-7 | Y-8 | Y-9 | Y-10 |
| Name of clear coating composition (Z) | Z-1 | Z-1 | Z-1 | Z-1 | Z-1 | Z-1 | Z-1 | Z-1 | Z-1 | Z-1 |
| Dry film thickness μm | 0.2 | 0.2 | 0.2 | 0.2 | 0.2 | 0.2 | 0.2 | 0.2 | 1.3 | 0.04 |

TABLE 3-continued

| | | | | | | | | | | | |
|---|---|---|---|---|---|---|---|---|---|---|---|
| Coating film performance | Graininess (HG, micro-brilliance) | 28 | 28 | 32 | 32 | 33 | 26 | 28 | 36 | 38 | 36 |
| | Anti-water adhesion (80° C. × 5 h) | Pass | Pass | Pass | Pass | Pass | Pass | Pass | Pass | Pass | Pass |
| | 60° gloss | 141 | 142 | 135 | 141 | 134 | 141 | 142 | 132 | 135 | 136 |
| | Visual feeling of metal | 4 | 5 | 3 | 5 | 3 | 4 | 5 | 3 | 3 | 4 |

| | | Examples | | | | | | Comparative Examples | | | |
|---|---|---|---|---|---|---|---|---|---|---|---|
| | | 11 | 12 | 13 | 14 | 15 | 16 | 1 | 2 | 3 | 4 |
| | Name of substrate | 1 | 1 | 1 | 1 | 1 | 2 | 1 | 1 | 1 | 1 |
| | Name of colored coating composition (X) | X-1 | X-1 | X-1 | X-1 | X-1 | X-1 | X-1 | X-1 | X-1 | X-1 |
| | Name of effect dispersion (Y) | Y-10 | Y-9 | Y-11 | Y-12 | Y-13 | Y-2 | Y-14 | Y-15 | Y-16 | Y-2 |
| | Name of clear coating composition (Z) | Z-1 | Z-1 | Z-1 | Z-1 | Z-1 | Z-1 | Z-1 | Z-1 | Z-1 | Z-2 |
| | Dry film thickness μm | 0.025 | 1.6 | 0.2 | 0.2 | 0.2 | 0.2 | 0.2 | 0.2 | 0.2 | 0.2 |
| Coating film performance | Graininess (HG, micro-brilliance) | 38 | 40 | 28 | 44 | 30 | 25 | 50 | 40 | 46 | 28 |
| | Anti-water adhesion (80° C. × 5 h) | Pass | Pass | Pass | Pass | Pass | Pass | Pass | Fail | Pass | Fail |
| | 60° gloss | 138 | 135 | 140 | 138 | 139 | 140 | 120 | 130 | 125 | 140 |
| | Visual feeling of metal | 4 | 4 | 5 | 3 | 4 | 5 | 1 | 2 | 1 | 5 |

Test Example 2

In the following experiments, the same points as Test Example 1 are omitted, and different points are described.

1. Surface Modifier (A)

The surface modifiers (A) used herein were the same surface modifiers (A-1) to (A-4) of Table 1 used in Test Example 1.

2. Production of Effect Pigment Dispersion (Y)

Production Example 1B 92 parts of distilled water, 1 part of the surface modifier (A-1) (Note 1), 5 parts (solids content of 0.5 parts) of Hydroshine WS-3004 (trade name, an aqueous vapor-deposition aluminum flake pigment, produced by Eckart, solids content: 10%, internal solvent: isopropanol, average particle size D50: 13 μm, thickness: 0.05 μm; the surface was treated with silica), 1.23 parts (solids content of 0.15 parts) of Cymel 325 (trade name, methyl-etherified melamine resin, produced by Nihon Cytec Industries Inc., solids content: 80%), 1.8 parts (solids content of 0.49 parts) of Acrysol ASE-60 (a polyacrylic acid-based viscosity modifier, produced by The Dow Chemical Company, solids content: 28%), and 0.18 parts of dimethylethanolamine were blended, stirred, and mixed, thereby obtaining an effect pigment dispersion (Y-1B).

Production Examples 2B to 16B

Effect pigment dispersions (Y-2B) to (Y-16B) were obtained in the same manner as in Production Example 1B, except that the formulations shown in Table 4 were used.

The details of the components shown in the table are as follows.

"Imprafix 2794 XP": trade name, produced by Covestro AG, a blocked aliphatic polyisocyanate compound, solids content: 38%

"Diyanal HR517": trade name, produced by Mitsubishi Rayon Co., Ltd., acrylic resin containing N-butoxymethylacrylamide as a polymerizable component, solids content: 50%

"Rheocrysta": trade name, a cellulose-based viscosity modifier (cellulose nanofiber), produced by Dai-Ichi Kogyo Seiyaku Co., Ltd., solids content: 2%

TABLE 4

Numerical values in parentheses in the table are solids contents.

| | | | | Production Example No. | | | | | | | |
|---|---|---|---|---|---|---|---|---|---|---|---|
| | | | | 1B | 2B | 3B | 4B | 5B | 6B | 7B | 8B |
| Formulation | Name of effect pigment dispersion | | | Y-1B | Y-2B | Y-3B | Y-4B | Y-5B | Y-6B | Y-7B | Y-8B |
| | Water | Distilled water | | 92 | 92 | 92 | 92 | 92 | 92 | 92 | 92 |
| | Surface modifier | Surface modifier (A) | A-1 | 1 | 1 | 1 | 1 | 1 | 1 | 1 | 1 |
| | | | A-2 | | | | | | | | |
| | | | A-3 | | | | | | | | |
| | | Surface modifier other than surface modifier (A) | A-4 | | | | | | | | |
| | Effect pigment (B) | Vapor-deposition aluminum flake | WS3004 | 5 (0.5) | 5 (0.5) | 5 (0.5) | 5 (0.5) | 3 (0.3) | 6 (0.6) | 2 (0.2) | 6.5 (0.65) |
| | Crosslinkable component | Melamine resin | Cymel 325 | 0.23 (0.15) | | | | | | | |
| | | Blocked isocyanate compound | Imprafix 2796 | | 0.33 (0.15) | | | | | | |
| | | Acrylic resin containing N-butoxyacrylamide | Diyanal HR517 | | | 0.63 (0.15) | | 0.21 (0.05) | 2.1 (0.5) | 0.63 (0.15) | 0.63 (0.15) |
| | Viscosity modifier (C) | ASE-60 | | 1.8 (0.49) | 1.8 (0.49) | 1.8 (0.49) | 1.8 (0.49) | 1.8 (0.49) | 1.8 (0.49) | 1.8 (0.49) | 1.8 (0.49) |
| | | Rheocrysta | | | | | | | | | |
| | | Dimethylethanolamine | | 0.18 | 0.18 | 0.18 | 0.18 | 0.18 | 0.18 | 0.18 | 0.18 |

TABLE 4-continued

Numerical values in parentheses in the table are solids contents.

| Performance | Light transmittance at a wavelength of 550 nm when the film thickness of the effect coating film is 0.2 μm (%) | 25 | 25 | 25 | 25 | 25 | 25 | 50 | 10 |
|---|---|---|---|---|---|---|---|---|---|
| | Coating composition viscosity B60 value (mPa · s) | 150 | 150 | 150 | 150 | 150 | 150 | 150 | 150 |
| | Concentration of effect pigment (B) in coating composition (%) | 0.5 | 0.5 | 0.5 | 0.5 | 0.5 | 0.6 | 0.39 | 1.23 |

| | | | | Production Example No. | | | | | | | |
|---|---|---|---|---|---|---|---|---|---|---|---|
| | | | | 9B | 10B | 11B | 12B | 13B | 14B | 15B | 16B |
| Formulation | Name of effect pigment dispersion | | | Y-9B | Y-10B | Y-11B | Y-12B | Y-13B | Y-14B | Y-15B | Y-16B |
| | Water | Distilled water | | 92 | 92 | 92 | 92 | 92 | 92 | 90 | 90 |
| | Surface modifier | Surface modifier (A) | A-1 | 1 | 1 | 1 | | | | 1 | 1 |
| | | | A-2 | | | | 1 | | | | |
| | | | A-3 | | | | | 1 | | | |
| | | Surface modifier other than surface modifier (A) | A-4 | | | | | | 1 | | |
| | Effect pigment (B) | Vapor-deposition aluminum flake | WS3004 | 5 (0.5) | 5 (0.5) | 5 (0.5) | 5 (0.5) | 3 (0.3) | 6 (0.6) | 1.4 (0.14) | 8.5 (0.85) |
| | Crosslinkable component | Melamine resin | Cymel 325 | 0.23 (0.15) | | | | | | | |
| | | Blocked isocyanate compound | Imprafix 2796 | | 0.33 (0.15) | | | | | | |
| | | Acrylic resin containing N-butoxyacrylamide | Diyanal HR517 | 0.63 (0.15) | 0.63 (0.15) | | 0.63 (0.15) | 0.63 (0.15) | 0.63 (0.15) | 0.63 (0.15) | 0.63 (0.15) |
| | Viscosity modifier (C) | ASE-60 | | 1.2 (0.34) | 11.4 (3.2) | | 1.8 (0.49) | 1.8 (0.49) | 1.8 (0.49) | 1.7 (0.48) | 1.0 (0.28) |
| | | Rheocrysta | | | | 24.5 (0.49) | | | | | |
| | | Dimethylethanolamine | | 0.15 | 0.23 | | 0.18 | 0.18 | 0.18 | 0.18 | 0.18 |
| Performance | Light transmittance at a wavelength of 550 nm when the film thickness of the effect coating film is 0.2 μm (%) | | | 25 | 25 | 25 | 25 | 25 | 75 | 60 | 5 |
| | Coating composition viscosity B60 value (mPa · s) | | | 60 | 1500 | 150 | 150 | 150 | 150 | 150 | 150 |
| | Concentration of effect pigment (B) in coating composition (%) | | | 0.5 | 0.5 | 0.5 | 0.5 | 0.5 | 0.5 | 0.5 | 0.5 |

3. Preparation of Substrate

A substrate 1 was produced according to "4. Preparation of Substrate" in Test Example 1.

4. Preparation of Test Plate

Example 1B

A colored coating composition (X-1) "WP-522H N-2.0" (trade name, produced by Kansai Paint Co., Ltd., a polyester resin-based aqueous intermediate coating composition, L* value of the coating film to be obtained: 20) was applied to the substrate 1 to a cured film thickness of 20 μm by electrostatic spraying using a rotary atomization-type bell-shaped coating device. After the resulting film was allowed to stand for 3 minutes, preheating was performed at 80° C. for 3 minutes. Further, an effect pigment dispersion (Y-1B) produced as described above was adjusted to have a coating composition viscosity shown in Table 4, and applied to a dry coating film thickness of 0.1 μm using a robot bell (produced by ABB) under the conditions in which the booth temperature was 23° C. and the humidity was 68%. The resultant was then allowed to stand at 80° C. for 3 minutes. Subsequently, the dried coating surface was coated with a clear coating composition (Z-1B) "KINO1210" (trade name, Kansai Paint Co., Ltd., a carboxy-containing resin/epoxy-containing resin curable one-component organic solvent-based coating composition) to a dry coating film thickness of 25 to 35 μm using a robot bell (produced by ABB) under the conditions in which the booth temperature was 23° C. and the humidity was 68%. After coating, the resultant was allowed to stand at room temperature for 15 minutes, and then heated in a hot air circulation-type dryer at 140° C. for 30 minutes to simultaneously dry the multilayer coating films, thereby obtaining a test plate.

The film thickness of the dry coating film shown in Table 5 was calculated from the following formula. The same applies to the following Examples.

x=sc/sg/S*10000 x: film thickness [μm]

sc: coating solids content [g]

sg: coating film specific gravity [g/cm$^3$]

S: evaluation area of coating solids content [cm$^2$]

Examples 2B to 18B and Comparative Examples 1B to 6B

Test plates were obtained in the same manner as in Example 1B, except that the substrates and coating compositions shown in Table 5 were used.

The clear coating compositions (Z-2B) to (Z-9B) in the table are as follows.

TABLE 5

| | | Examples | | | | | | | | | | | |
|---|---|---|---|---|---|---|---|---|---|---|---|---|---|
| | | 1B | 2B | 3B | 4B | 5B | 6B | 7B | 8B | 9B | 10B | 11B | 12B |
| | Name of substrate | 1 | 1 | 1 | 1 | 1 | 1 | 1 | 1 | 1 | 1 | 1 | 1 |
| | Name of effect dispersion (Y) | Y-1B | Y-2B | Y-3B | Y-5B | Y-6B | Y-7B | Y-8B | Y-9B | Y-10B | Y-11B | Y-12B | Y-13B |
| | Dry film thickness of effect coating film (μm) | 0.2 | 0.2 | 0.2 | 0.2 | 0.2 | 0.1 | 0.3 | 0.2 | 0.2 | 0.2 | 0.2 | 0.2 |
| | Name of dear coating composition (Z) | Z-1B | Z-1B | Z-1B | Z-1B | Z-1B | Z-1B | Z-1B | Z-1B | Z-1B | Z-1B | Z-1B | Z-1B |
| Coating film performance | Graininess (HG, micro-brilliance) | 30 | 30 | 30 | 26 | 40 | 40 | 28 | 28 | 40 | 25 | 30 | 30 |
| | Anti-water adhesion (80° C. × 5 h) | Pass | Pass | Pass | Pass | Pass | Pass | Pass | Pass | Pass | Pass | Pass | Pass |
| | Anti-water adhesion after exposure to severe weather * | Pass | Pass | Pass | Pass | Pass | Pass | Pass | Pass | Pass | Pass | Pass | Pass |
| | 60° gloss | 140 | 140 | 140 | 145 | 135 | 145 | 130 | 145 | 135 | 160 | 140 | 140 |
| | Visual feeling of metal | 5 | 5 | 5 | 5 | 4 | 4 | 4 | 5 | 4 | 5 | 5 | 5 |

| | | Examples | | | | | | Comparative Examples | | | | | |
|---|---|---|---|---|---|---|---|---|---|---|---|---|---|
| | | 13B | 14B | 15B | 16B | 17B | 18B | 1B | 2B | 38 | 4B | 5B | 6B |
| | Name of substrate | 1 | 1 | 1 | 1 | 1 | 1 | 1 | 1 | 1 | 1 | 1 | 1 |
| | Name of effect dispersion (Y) | Y-4B | Y-4B | Y-4B | Y-3B | Y-4B | Y-4B | Y-14B | Y-15B | Y-16B | Y-4B | Y-4B | Y-4B |
| | Dry film thickness of effect coating film (μm) | 0.2 | 0.2 | 0.2 | 0.2 | 0.2 | 0.2 | 0.2 | 0.1 | 0.5 | 0.2 | 0.2 | 0.2 |
| | Name of dear coating composition (Z) | Z-2B | Z-3B | Z-4B | Z-5B | Z-6B | Z-7B | Z-1B | Z-1B | Z-1B | Z-1B | Z-8B | Z-9B |
| Coating film performance | Graininess (HG, micro-brilliance) | 30 | 30 | 30 | 30 | 27 | 40 | 50 | 50 | 33 | 28 | 26 | 50 |
| | Anti-water adhesion (80° C. × 5 h) | Pass | Pass | Pass | Pass | Pass | Pass | Pass | Pass | Fail | Fail | Fail | Pass |
| | Anti-water adhesion after exposure to severe weather * | Pass | Pass | Pass | Pass | Pass | Pass | Pass | Pass | Fail | Fail | Fail | Pass |
| | 60° gloss | 140 | 140 | 140 | 140 | 143 | 133 | 110 | 145 | 125 | 142 | 145 | 125 |
| | Visual feeling of metal | 5 | 5 | 5 | 5 | 5 | 4 | 1 | 1 | 2 | 5 | 5 | 2 |

(Z-2B): a one-component clear coating composition obtained by adding 10 parts by mass of "Cymel 325" to "KINO1210" based on 100 parts by mass of the resin solids content contained in the "KINO1210"

(Z-3B): a one-component clear coating composition obtained by adding 10 parts by mass of "Imprafix2794XP" to "KINO1210" based on 100 parts by mass of the resin solids content contained in the "KINO1210"

(Z-4B): a one-component clear coating composition obtained by adding 10 parts by mass of "Diyanal HR517" to "KINO1210" based on 100 parts by mass of the resin solids content contained in the "KINO1210"

(Z-5B): "TC-71": trade name, produced by Kansai Paint Co., Ltd., a hydroxy-containing resin/melamine resin curing one-component organic solvent-based coating composition (Z-6B): a one-component clear coating composition obtained by adding 5 parts by mass of "Diyanal HR517" to "KINO1210" based on 100 parts by mass of the resin solids content contained in the "KINO1210"

(Z-7B): a one-component clear coating composition obtained by adding 20 parts by mass of "Diyanal HR517" to "KINO1210" based on 100 parts by mass of the resin solids content contained in the "KINO1210"

(Z-8B): a one-component clear coating composition obtained by adding 2 parts by mass of "Diyanal HR517" to "KINO1210" based on 100 parts by mass of the resin solids content contained in the "KINO1210"

(Z-9B): a one-component clear coating composition obtained by adding 30 parts by mass of "Diyanal HR517" to "KINO1210" based on 100 parts by mass of the resin solids content contained in the "KINO1210"

5. Evaluation of Coating Film

The appearance and performance of the coating film of each test plate obtained in the above manner were evaluated for the same items as in "6. Evaluation of Coating Film" of Test Example 1. Table 5 shows the results. The anti-water adhesion after exposure to severe weather was evaluated as described below.

Anti-Water Adhesion after Exposure to Severe Weather

Each test plate was subjected to the following conditions for 2 hours per cycle, including irradiation with a xenon arc lamp for 1 hour and 42 minutes and raining for 18 minutes, using a super xenon weatherometer (trade name, produced by Suga Test Instruments Co., Ltd.) specified in JIS B 7754. This cycle was repeated for 2000 hours. Thereafter, the test plates were each immersed in water at 40° C. for 10 days. After removing each test plate from the water, the condition of squares remaining was checked in the same manner as described above regarding anti-water adhesion, and anti-water adhesion was evaluated.

Pass: 100 squares of the coating film remained, and no small edge-chipping of the coating film occurred at the edge of the cut made by the cutter knife.

Fail: The remaining number of squares of the coating film was 99 or less.

The embodiments and Examples of the present invention are described in detail above. However, the present invention is not limited to the above-mentioned embodiments, and various modifications can be made based on the technical idea of the present invention.

Furthermore, the present invention can also employ the following structures.

[1] A method for forming a multilayer coating film by sequentially performing the following steps (1) to (4):

(1) applying a colored coating composition (X) to a substrate to form a colored coating film, (2) applying an effect pigment dispersion (Y) to the colored coating film formed in step (1) to form an effect coating film, (3) applying a clear coating composition (Z) to the effect coating film formed in step (2) to form a clear coating film, and (4) heating the uncured colored coating film, the uncured effect coating film, and the uncured clear coating film formed respectively in steps (1) to (3) to simultaneously cure these three coating films;

wherein the effect pigment dispersion (Y) contains water, a surface modifier (A), a flake-effect pigment (B), and a viscosity modifier (C), the surface modifier (A) has a contact angle of 8 to 20° with respect to a previously degreased tin plate (produced by Paltek Corporation), the contact angle being measured in such a manner that a liquid that is a mixture of isopropanol, water, and the surface modifier (A) at a ratio of 4.5/95/1 is adjusted to have a viscosity of 150 mPa·s measured by a B-type viscometer at a rotor rotational speed of 60 rpm at a temperature of 20° C., 10 µL of the liquid is added dropwise to the tin plate, and the contact angle with respect to the tin plate is measured 10 seconds after dropping, and a film obtained by applying the effect pigment dispersion (Y) to a dry film thickness of 0.2 µm has a light transmittance at a wavelength of 550 nm of 10 to 50%.

[2] The method for forming a multilayer coating film according to [1], wherein the clear coating composition (Z) is a one-component clear coating composition; and the effect pigment dispersion (Y) and/or the clear coating composition (Z) contains at least one crosslinkable component (D) selected from the group consisting of melamine, a melamine derivative, (meth)acrylamide, an N-methylol group- or N-alkoxymethyl group-containing (meth)acrylamide copolymer, and a blocked or unblocked polyisocyanate compound, when the effect pigment dispersion (Y) contains the crosslinkable component (D), the content thereof as a solids content is within a range of 10 to 100 parts by mass based on 100 parts by mass of the solids content of the effect pigment in the effect pigment dispersion (Y), and when the clear coating composition (Z) contains the crosslinkable component (D), the content thereof as a solids content is within a range of 5 to 25 parts by mass based on 100 parts by mass of the resin solids content of the clear coating composition (Z).

[3] The method for forming a multilayer coating film according to [1], wherein the clear coating composition (Z) is a two-component clear coating composition containing a hydroxy-containing resin and a polyisocyanate compound.

[4] The method for forming a multilayer coating film according to any one of [1] to [3], wherein the effect pigment dispersion (Y) has a viscosity (B60) of 60 to 1500 mPa·s measured using a B-type viscometer at a rotor rotational speed of 60 rpm at a temperature of 20° C.

[5] The method for forming a multilayer coating film according to any one of [1] to [4], wherein the surface modifier (A) is a silicone-based surface modifier.

[6] The method for forming a multilayer coating film according to any one of [1] to [5], wherein the surface modifier (A) has a dynamic surface tension of 50 to 70 mN/m.

[7] The method for forming a multilayer coating film according to any one of [1] to [6], wherein the flake-effect pigment (B) is contained in the effect pigment dispersion (Y) in an amount of 0.05 to 3.0 parts by mass, based on 100 parts by mass of the total amount of water, the surface modifier (A), the flake-effect pigment (B), and the viscosity modifier (C).

[8] The method for forming a multilayer coating film according to any one of [1] to [7], wherein the effect coating film has a dry film thickness of 0.02 to 5.0 µm.

[9] The method for forming a multilayer coating film according to any one of [1] to [7], wherein the effect coating film has a dry film thickness of 0.01 to 1.0 µm.

[10] The method for forming a multilayer coating film according to any one of [1] to [9], wherein the clear coating composition (Z) contains a carboxy-containing resin and an epoxy-containing resin.

[11] The method for forming a multilayer coating film according to any one of [1] to [10], wherein the clear coating composition (Z) contains a hydroxy-containing resin and a melamine resin.

INDUSTRIAL APPLICABILITY

The method for forming a multilayer coating film of the present invention can be applied to various industrial products, particularly interior and exterior panels of automobile bodies, and automobile components.

The invention claimed is:

1. A method for forming a multilayer coating film by sequentially performing the following steps (1) to (4):
    (1) applying a colored coating composition (X) to a substrate to form a colored coating film,
    (2) applying an effect pigment dispersion (Y) to the colored coating film formed in step (1) to form an effect coating film,
    (3) applying a clear coating composition (Z) to the effect coating film formed in step (2) to form a clear coating film, and
    (4) heating the uncured colored coating film, the uncured effect coating film, and the uncured clear coating film formed respectively in steps (1) to (3) to simultaneously cure these three coating films;
    wherein:
    the effect pigment dispersion (Y) contains a base resin, water, a surface modifier (A), a flake-effect pigment (B), a viscosity modifier (C), and optionally at least one crosslinkable component (D), wherein a ratio of the flake-effect pigment (B) to the total amount of the base resin and the crosslinkable component (D) is within a range of 4/3 to 100/1, based on the solids content mass, as calculated based on the following formula:

4/3 to 100/1=flake-effect pigment (B)/(base resin+ crosslinkable component (D)), a solids content of the effect pigment dispersion (Y) during coating is 0.1 to 15.0 mass %,
    the surface modifier (A) has a contact angle of 8 to 20° with respect to a previously degreased tin plate, the contact angle being measured in such a manner that a liquid that is a mixture of isopropanol, water, and the surface modifier (A) at a ratio of 4.5/95/1 is adjusted to have a viscosity of 150 mPa·s measured by a B-type viscometer at a rotor rotational speed of 60 rpm at a temperature of 20° C., 10 µL of the liquid is added dropwise to the tin plate, and the contact angle with respect to the tin plate is measured 10 seconds after dropping,
    a film obtained by applying the effect pigment dispersion (Y) to a dry film thickness of 0.2 µm has a light transmittance at a wavelength of 550 nm of 10 to 50%, and
    the effect coating film has a dry film thickness of 0.01 to 4.0 µm.

2. The method for forming a multilayer coating film according to claim 1, wherein the clear coating composition (Z) is a one-component clear coating composition; and
    the effect pigment dispersion (Y) and/or the clear coating composition (Z) contains the at least one crosslinkable component (D), wherein the at least one crosslinkable component (D) is selected from the group consisting of melamine, a melamine derivative, (meth)acrylamide, an N-methylol group- or N-alkoxymethyl group-containing (meth)acrylamide copolymer, and a blocked or unblocked polyisocyanate compound, wherein:

when the effect pigment dispersion (Y) contains the crosslinkable component (D), the content thereof as a solids content is within a range of 10 to 100 parts by mass based on 100 parts by mass of the solids content of the effect pigment in the effect pigment dispersion (Y), and when the clear coating composition (Z) contains the crosslinkable component (D), the content thereof as a solids content is within a range of 5 to 25 parts by mass based on 100 parts by mass of the resin solids content of the clear coating composition (Z).

3. The method for forming a multilayer coating film according to claim 1, wherein the clear coating composition (Z) is a two-component clear coating composition containing a hydroxy-containing resin and a polyisocyanate compound.

4. The method for forming a multilayer coating film according to claim 1, wherein the effect pigment dispersion (Y) has a viscosity (B60) of 60 to 1500 mPa·s measured using a B-type viscometer at a rotor rotational speed of 60 rpm at a temperature of 20° C.

5. The method for forming a multilayer coating film according to claim 1, wherein the surface modifier (A) is a silicone-based surface modifier.

6. The method for forming a multilayer coating film according to claim 1, wherein the surface modifier (A) has a dynamic surface tension of 50 to 70 mN/m.

7. The method for forming a multilayer coating film according to claim 1, wherein the flake-effect pigment (B) is contained in the effect pigment dispersion (Y) in an amount of 0.05 to 3.0 parts by mass, based on 100 parts by mass of the total amount of water, the surface modifier (A), the flake-effect pigment (B), and the viscosity modifier (C).

8. The method for forming a multilayer coating film according to claim 1, wherein the effect coating film has a dry film thickness of 0.01 to 1.0 μm.

9. The method for forming a multilayer coating film according to claim 1, wherein the clear coating composition (Z) contains a carboxy-containing resin and an epoxy-containing resin.

10. The method for forming a multilayer coating film according to claim 1, wherein the clear coating composition (Z) contains a hydroxy-containing resin and a melamine resin.

11. The method for forming a multilayer coating film according to claim 1, wherein the water is contained in the effect pigment dispersion (Y) in an amount of 70 to 99 parts by mass, and the flake-effect pigment (B) is contained in the effect pigment dispersion (Y) in an amount of 0.05 to 3.0 parts by mass based on 100 parts by mass of the total amount of water, the surface modifier (A), the flake-effect pigment (B), and the viscosity modifier (C).

12. The method for forming a multilayer coating film according to claim 1, wherein the base resin is acrylic resin, polyester resin, alkyd resin or urethane resin.

* * * * *